US009961518B2

(12) United States Patent
Alston et al.

(10) Patent No.: US 9,961,518 B2
(45) Date of Patent: **\*May 1, 2018**

(54) SYSTEMS AND METHODS FOR MESSAGING USING A BROADBAND CONNECTION

(71) Applicant: AT&T INTELLECTUAL PROPERTY I, LP, Atlanta, GA (US)

(72) Inventors: Douglas B. Alston, Fayetteville, GA (US); Barbara Stark, Roswell, GA (US); Valois Gonzalez, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/075,238

(22) Filed: Mar. 21, 2016

(65) Prior Publication Data
US 2016/0205520 A1    Jul. 14, 2016

Related U.S. Application Data

(60) Continuation of application No. 13/565,895, filed on Aug. 3, 2012, now Pat. No. 9,338,029, which is a division of application No. 12/123,893, filed on May 20, 2008, now abandoned, which is a continuation of application No. 10/236,224, filed on Sep. 6, 2002, now Pat. No. 7,376,126.

(51) Int. Cl.
*H04W 4/12* (2009.01)
*H04L 12/66* (2006.01)
*H04M 3/42* (2006.01)

(52) U.S. Cl.
CPC ............. *H04W 4/12* (2013.01); *H04L 12/66* (2013.01); *H04M 3/42382* (2013.01)

(58) Field of Classification Search
CPC ......................... H04W 4/12; H04M 3/42382
See application file for complete search history.

(56) References Cited

U.S. PATENT DOCUMENTS

| 5,475,738 A | 12/1995 | Penzias |
| 5,603,081 A * | 2/1997 | Raith ................... H04B 7/2643 370/337 |
| 5,612,943 A | 3/1997 | Moses et al. |
| 5,684,861 A | 11/1997 | Lewis et al. |
| 5,742,668 A | 4/1998 | Pepe et al. |
| 5,742,905 A | 4/1998 | Pepe et al. |
| 6,119,014 A * | 9/2000 | Alperovich ............. H04L 51/38 340/7.39 |
| 6,122,348 A | 9/2000 | French-St et al. |

(Continued)

*Primary Examiner* — Luat Phung
(74) *Attorney, Agent, or Firm* — Chiesa Shahinian & Giantomasi PC

(57) ABSTRACT

Systems and methods for sending and receiving text, or data, messages between wireless communication devices and wireline-messaging devices utilize a broadband connection to the wireline premises as the signaling channel. A message application server sends messages directly to wireline-messaging devices through a digital network, such as the Internet. Such systems and methods include wireline-messaging devices integrated with premises telephones connected to a PSTN, in which the telephones are adapted with thin client software to send and receive data messages.

15 Claims, 5 Drawing Sheets

(56) References Cited

U.S. PATENT DOCUMENTS

| | | | |
|---|---|---|---|
| 6,185,184 B1 | 2/2001 | Mattaway et al. | |
| 6,212,535 B1 | 4/2001 | Goldenthal et al. | |
| 6,240,296 B1 | 5/2001 | Yu et al. | |
| 6,278,862 B1 | 8/2001 | Henderson et al. | |
| 6,317,781 B1 | 11/2001 | De Boor et al. | |
| 6,389,276 B1 | 5/2002 | Brilla et al. | |
| 6,424,647 B1 | 7/2002 | Ng et al. | |
| 6,456,625 B1 | 9/2002 | Itoi et al. | |
| 6,704,294 B1 | 3/2004 | Cruickshank et al. | |
| 6,810,034 B1 | 10/2004 | Brand et al. | |
| 7,031,699 B1 * | 4/2006 | Andersen | H04L 41/5064 379/15.02 |
| 7,136,468 B2 | 11/2006 | Khan et al. | |
| 7,320,026 B2 | 1/2008 | Adamczyk et al. | |
| 2001/0013069 A1 * | 8/2001 | Shah | G06Q 10/109 709/238 |
| 2002/0089968 A1 | 7/2002 | Johansson et al. | |
| 2002/0191635 A1 | 12/2002 | Chow et al. | |
| 2003/0002637 A1 | 1/2003 | Miyauchi et al. | |
| 2003/0046328 A1 * | 3/2003 | Goo | H04L 12/5895 709/200 |
| 2003/0054844 A1 | 3/2003 | Anvekar et al. | |
| 2003/0061290 A1 | 3/2003 | Koch et al. | |
| 2003/0063615 A1 | 4/2003 | Luoma et al. | |
| 2003/0226143 A1 * | 12/2003 | Michael | H04N 7/16 725/32 |
| 2004/0013069 A1 | 1/2004 | Uno et al. | |
| 2004/0203610 A1 | 10/2004 | Deeds et al. | |
| 2006/0050862 A1 | 3/2006 | Shen et al. | |
| 2006/0242250 A1 | 10/2006 | Koch et al. | |

* cited by examiner

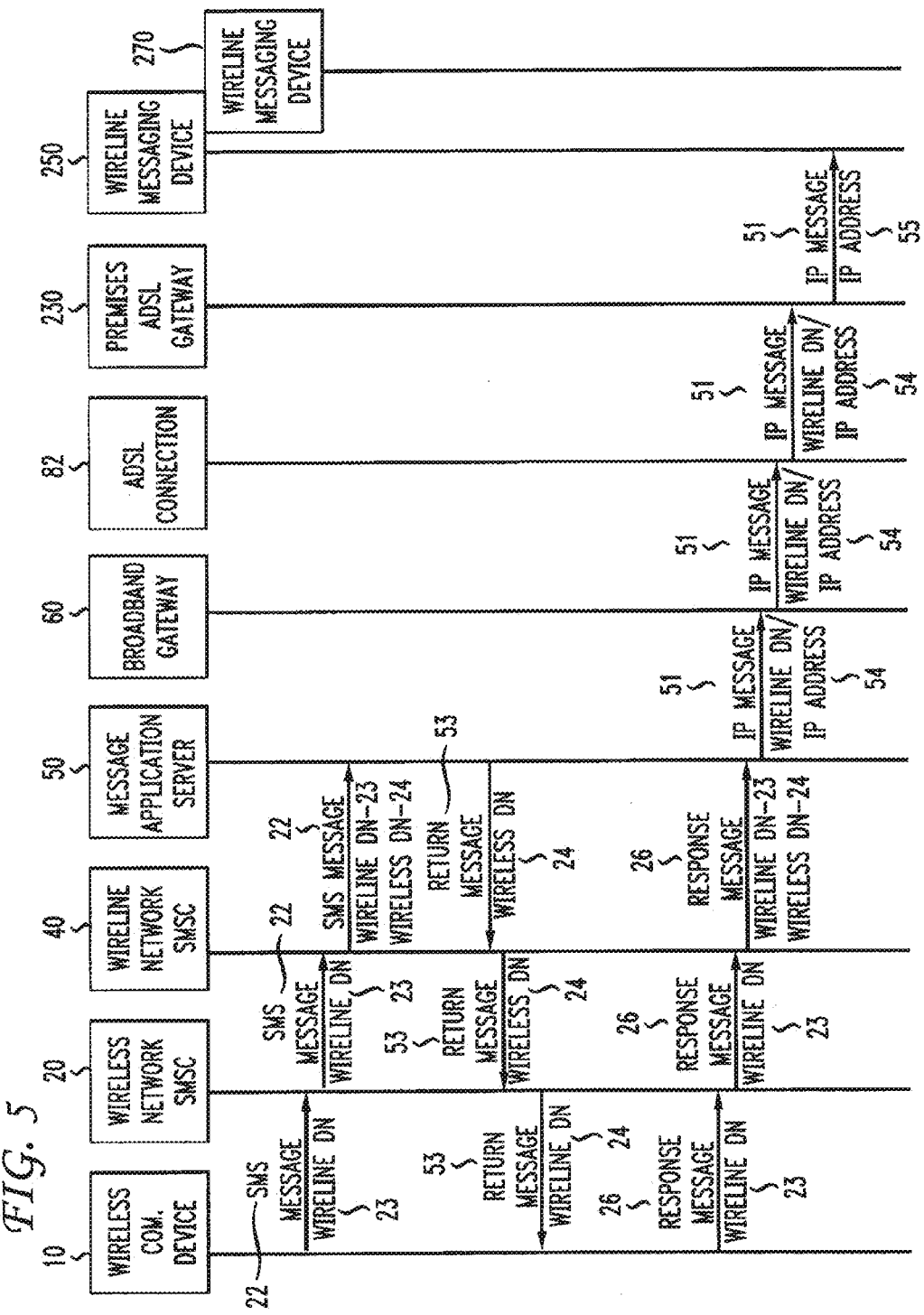

SYSTEMS AND METHODS FOR MESSAGING USING A BROADBAND CONNECTION

CROSS-REFERENCE TO RELATED APPLICATIONS

This application is a Continuation of and claims priority to U.S. patent application Ser. No. 13/565,895 filed Aug. 3, 2012, which is a Divisional of and claims priority to U.S. patent application Ser. No. 12/123,893 filed May 20, 2008, which is a Continuation of and claims priority to U.S. patent application Ser. No. 10/236,224 filed Sep. 6, 2002. The contents of each of the foregoing is/are hereby incorporated by reference into this application as if set forth herein in full.

NOTICE OF COPYRIGHT PROTECTION

A portion of the disclosure of this patent document and its attachments contain material, which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE DISCLOSURE

The present invention relates generally to the field of telecommunications. More particularly, the present invention relates to systems and methods for sending and receiving data messages between wireless and wireline communication devices using a broadband connection as a signaling channel.

BACKGROUND OF THE DISCLOSURE

Conventional text messaging systems use narrow-band signaling techniques similar to call-number delivery currently in use in the public switched telephone network (PSTN). In such systems, narrow-band exclusion is used as the signaling channel. Advanced Intelligent Network (AIN) components are also utilized to send simple, or short, text messages from wireless devices to modified landline, or wireline, terminal devices. One disadvantage of such systems is that modifications must be made to narrow-band analog communication channels to provide the exclusions necessary to simultaneously transmit digital data messages. Another disadvantage is that narrow-band transmissions can accommodate only limited data-file sizes and transmission speeds. In addition, when text messages are transmitted to the home over narrow-band frequencies, a user must either leave a personal computer (PC) on all of the time or experience the inconvenience of having to boot up a PC to check messages.

Another disadvantage of using narrow-band connections for data messaging is that a connection must be made with a user's internet service provider (ISP) through a dial-up service in order to check messages. Often, when there is only one telephone line to a home, a home telephone is in use and one is unable to connect to the ISP for Internet connection.

Given such limitations to text messaging to wireline-messaging devices in the home, an opportunity for exchange of consumer information is lost. Advertisers are unable to quickly and reliably transmit advertising information to potential customers in their homes. Consumers are unable to quickly request and receive product information, sales notifications, and other marketing information in the convenience of their homes through direct data communications using existing telecommunications equipment.

As a result, there is a need for systems and methods of wireless-wireline messaging utilizing a broadband connection to premises such as the home and small business. There is a need for such systems and methods that do not require leaving a personal computer on all the time, or the inconvenience of booting up a PC, to check messages. There is a need for such systems and methods that utilize existing home telephones for sending and receiving data messages.

There is a need for such systems and methods that allow message retrieval without connecting to an ISP through a dial-up service. There is a need for such systems and methods that allow an "always on" connection for quick and reliable delivery of data messages, and that allow transmission of large communications files, such as for video and multi-media. There is also a need for such systems and methods that provide a means for quick and reliable transmission of consumer and advertising information to potential customers in their homes.

SUMMARY

The present invention provides systems and methods for text, or data, messaging to and from wireline-messaging devices using a broadband connection to the wireline premises as the signaling channel. In one embodiment, a system for wireless-wireline data messaging comprises a wireless communication device for sending and receiving a data message, a message application server connected to a computer network, such as the Internet, and in communication with the wireless communication device, and a wireline-messaging device connected to a public switched telephone network (PSTN). The wireline-messaging device is adapted to send and receive the data message. The system includes a broadband connection between the message application server and the wireline-messaging device.

In embodiments of the present invention, the wireless communication device can be a cellular telephone, a personal digital assistant, a handheld computer, a two-way pager, or other communication device. Such a system includes a network message service center for both a wireless network and a wireline network for storing and forwarding the data message between the wireless communication device and the wireline communication device.

The broadband connection employed in embodiments of the present invention comprises various types of communication delivery systems. For example, in one embodiment, the broadband connection comprises a digital subscriber line (DSL), such as an asymmetric digital subscriber line (ADSL). In other embodiments, a broadband connection comprises a coaxial cable, or an "integrated fiber-in-the-loop" (IFITL) connection. Satellite-based data delivery systems may also be used.

Systems of the present invention also comprise a premises broadband gateway connected to a data network, such as the Internet, for routing a data message to a wireline-messaging device. In one embodiment, the wireline-messaging device comprises a premises telephone, a stand-alone device separate from a premises telephone, or a device integrated into a premises telephone. In embodiments in which the wireline-messaging device is a stand-alone device, the device can be connected to the premises broadband gateway using various connections, for example, using unshielded twisted pair copper wires, an Ethernet connection, or a wireless connection. Alternatively, the premises broadband gateway is integrated with the wireline-messaging device.

In one embodiment, the wireline-messaging device comprises a thin client software application to allow the wireline-messaging device to receive and send the data message independent of voice call processing. In embodiments, the thin client software application comprises a session initiation protocol, and can include support for instant messaging. Alternatively, the thin client software can comprise a wireless application protocol.

In one embodiment of the present invention, a static Internet protocol (IP) address is associated with the wireline-messaging device, and the IP address is stored in the message application server. In other embodiments, a non-static, or dynamic, IP address is associated with the wireline-messaging device. In such embodiments, a current dynamic IP address for the device is registered with, and stored in, the message application server. In embodiments in which a plurality of the wireline-messaging devices or user accounts are connected to the same premises broadband gateway, a unique static internet protocol (IP) address is associated with each of the plurality of the wireline-messaging devices or user accounts. In other embodiments having a plurality of wireline-messaging devices or user accounts connected to the same premises broadband gateway, a unique dynamic IP address is associated with each of the devices or accounts. In still other embodiments, a single static or dynamic IP address is associated with a premises broadband gateway, and a unique port is assigned to each of a plurality of devices.

Embodiments of the present invention include methods of wireless-wireline data message communication. One such method comprises sending a data message from a wireless communication device to a message application server connected to the Internet, using a wireline directory number (DN) associated with an intended premises as a terminating address for the data message. A return message is sent from the message application server to the wireless device requesting identification of an intended recipient of the data message from among a plurality of wireline-messaging devices associated with the wireline DN.

A user of the wireless communication device selects an intended recipient of the data message. The wireless device user sends a response message from the wireless device indicating the selected intended recipient to the message application server. The message application server is connected over a broadband, such as ADSL, connection with one of the plurality of wireline-messaging devices having a unique internet protocol (IP) address and that is connected to a premises broadband gateway. In an embodiment in which each of a plurality of wireline-messaging devices has a unique IP address, the connection between the message application server and each device comprises a point-to-point protocol session. The message application server maps the wireline DN associated with the intended premises to the unique Internet protocol (IP) address associated with the selected wireline-messaging device recipient, and sends the data message from the message application server to the premises broadband gateway. The premises broadband gateway then routes the data message to the selected recipient wireline-messaging device.

Features of systems and methods for messaging between wireless and wireline devices using a broadband connection of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

Systems and methods for messaging between wireless and wireline devices using a broadband connection of the present invention provide numerous advantages over prior messaging systems. For example, embodiments of the present invention advantageously provide a system and method for communicating data messages directly from a wireless communication device to a wireline-messaging device, utilizing existing broadband connections, such as an ADSL line, without the need for use of a narrow-band communication channel or AIN components. Another advantage is that the present invention provides systems and methods for data messaging at home that do not require leaving a personal computers on all the time, or the inconvenience of booting up a PC, to check messages.

Still another advantage of the present invention is that because broadband connections are "always on," delivery of data messages is quick. Data message delivery is also reliable in the present invention because messages can be stored and/or delivered even when the premises telephone is in use.

Another advantage is that the present invention provides for transmission of large communications files, such as for video and multi-media, by using broad bandwidth communication channels. Another advantage is that the present invention utilizes existing premises telephones and other communications devices, which can be modified with thin client software, to send and receive data messages.

Still another advantage is that the methods and systems of the present invention provide an efficient mechanism for providing detailed product, service, and promotional information to consumers. The methods and systems of the present invention benefit advertisers, wireless service providers, and current and potential customers by providing a means for supplying targeted information to consumers.

As will be realized by those of skill in the art, many different embodiments of systems and methods for messaging between wireless and wireline devices using a broadband connection according to the present invention are possible. Additional uses, objects, advantages, and novel features of the invention are set forth in the detailed description that follows and will become more apparent to those skilled in the art upon examination of the following or by practice of the invention.

BRIEF DESCRIPTION OF THE DRAWINGS

FIG. 5 is a flow diagram of wireless to wireline messaging using a broadband ADSL connection in an embodiment of a method of the present invention.

DETAILED DESCRIPTION OF THE DRAWINGS

Figure 1:
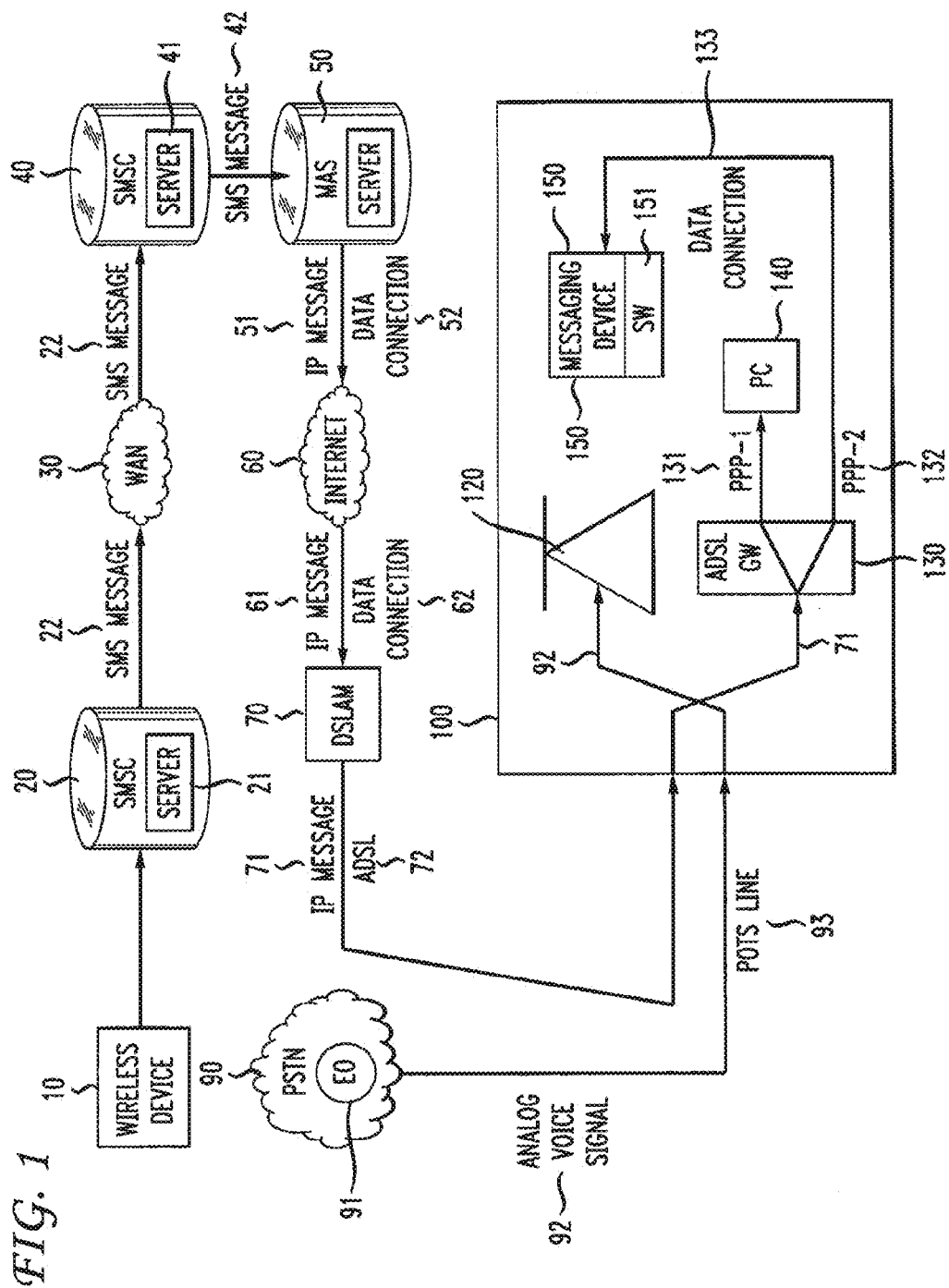
FIG. 1 is a block diagram of wireless to wireline messaging via a broadband ADSL connection with a stand-alone wireline-messaging device externally connected to a premises ADSL gateway in an embodiment of the present invention.

Embodiments of the present invention comprise systems and methods for providing text, or data, messaging between a wireline-messaging device connected to a public switched telephone network (PSTN) and another communication device. The wireline-messaging device is adapted to send and/or receive data messages. In one embodiment, a message application server is in communication with a wireless communication device and connected to a communication network, such as the Internet. A broadband connection between the message application server and the wireline premises is utilized as the signaling channel. FIGS. 1-5 show various aspects of embodiments of the present invention.

The systems of FIGS. 1-4 comprise a telephone network environment for sending and receiving a text message. A user of a wireless communication device 10 creates a text, or data, message using the keypad on the wireless device 10. In the embodiment shown, the wireless communication device 10 comprises a digital cellular telephone capable of originating and receiving voice messages and short text messages, such as those provided in a short message service (SMS) system. Wireless devices include digital cellular telephones, handheld computers, personal digital assistants, text pagers, and any digital terminals capable of sending and receiving data messages.

When the user of the wireless communication device 10 inputs a wireline device directory number (DN) and sends a message along with the DN, the wireless device automatically sends the message to the wireless network short message service center (SMSC) 20, which includes a SMSC server 21. An SMS service is a means by which short messages, for example, alphanumeric messages up to 160 characters, can be sent to and from communication devices. An SMSC operates the SMS system for sending and receiving messages to and from the wireless device. The SMSC 20 and server 21 store and forward, or route, SMS messages and provide administrative functions relating to the text messaging services. For example, an SMSC can support point-to-point, mobile-terminated, and mobile-originated messages, and may handle multiple input and output sources, such as electronic mail and web-based messaging. In the system in FIG. 1, the SMS message 22 is sent from the wireless communication device 10 to a wireline-messaging device 150 using a wireline directory number (DN) associated with the wireline-messaging device 150 as the routing address.

SMS messaging provides a targeted and efficient mechanism for transmitting short, messages to and from a communication device. An SMS message may be delivered to a wireless or wireline communication device whether or not the device is active at the time of attempted message delivery. In addition, an active terminal device can be configured to receive or submit an SMS message at any time, independent of whether a voice call or data transmission is in progress. Because SMS messages are stored in the SMSC until the terminal destination device becomes available, successful message delivery rates are quite high. As a result, SMS messaging is effective for reliable information transfer. Such a system provides effective information delivery for an advertiser, for example, because a potential consumer is reliably provided with requested information, whether or not the terminal device is in use.

The messaging systems embodied in FIGS. 1-4 comprise messages and centers of an SMS system. Other embodiments of data messaging systems include an enhanced message service (EMS), a multi-media message service (MMS), and messages transmitted using a wireless application protocol (WAP). Such messages and associated message service centers operate in similar fashion to that described herein for SMS messages and SMSCs.

Referring again to FIG. 1, the SMSC 20 sends the SMS message 22 to the wide area network (WAN) 30, where the SMS message 22 can be transferred to other cells or frequencies depending on transmission standards of particular networks utilized to reach the geographic destination of the message. The WAN 30 can include networks such as the global system for mobile communications (GSM), networks utilizing code division multiplex (CDMA) standards, and networks utilizing time division multiplex (TDMA) standards, as well as other digital transmission systems. The GSM, CDMA, and TDMA standards specify how each voice or data signal is transferred from a mobile switching center (MSC) to the wireless device 10 and back, as well as which transmission frequency is being used. The WAN 30 may include national and international coverage areas and may support more than one wireless technology.

From the wide area network 30, SMS message 22 is forwarded to a wireline network SMSC 40, which includes an SMSC server 41. The wireline network SMSC 40 and server 41 store and forward SMS messages to and from, for example, the wireline-messaging device 150 shown in FIG. 1, and provide administrative functions relating to the text messaging services similar to SMSC 20 and server 21 in the wireless network.

The wireline network SMSC server 41 forwards SMS message 42 in the wireline network to a message application server 50, configured to send data messages directly to a wireline-messaging device, for example, the wireline-messaging device 150 in the embodiment in FIG. 1. The wireline network SMS message 42 comprises the same message as the SMS message 22 in the wireless network. The SMS message 42 is transmitted in the wireline network.

The message application server 50 comprises an Authentication, Authorization, and Accounting (AAA) server. The AAA server 50 authenticates, or verifies, the identification of the sender of a message, authorizes access to the network to transmit the message, and provides charge accounting for access to the system. The message application server 50 composes an Internet Protocol (IP) message 51 based on the SMS message 42, and sends the IP message 51 through the Internet infrastructure.

In the embodiments of the present invention shown in FIGS. 1-4, the Internet 60 is connected to a customer premises 100 with a broadband data connection. IP message 61 is forwarded from the Internet 60 over the broadband data connection 62. The IP message 61 comprises the same message as IP message 51 forwarded from the message application server 50, IP message 61 being transmitted over the broadband data connection 62.

The IP message 61 is forwarded to a Digital Subscriber Line Access Multiplexer (DSLAM) 70. The DSLAM 70 shown is a packet multiplexer device, which serves as the point of interface between a number of subscriber premises and a carrier network. A DSLAM can be positioned in the Incumbent Local Exchange Carrier's (ILEC's) central office or may be enclosed in a digital loop carrier. In the embodiments shown in FIGS. 1-4, the DSLAM 70 transmits the IP message 71 forwarded from the Internet 70, over ADSL 72.

In a plain old telephone service (POTS) system, a premises telephone is connected to a POTS central office over copper wires that are wound around each other and referred to as an unshielded twisted pair (UTP or "twisted pair"). A premises is defined as any location, such as a home, factory, or office, having a terminal communication device and a directory number associated with the device. Conventional phone systems are designed to exchange voice information using an analog signal. In an analog system, an input device, such as a telephone, converts an acoustic signal (a natural analog signal) into an electrical equivalent in terms of volume (signal amplitude) and pitch (frequency of wave change). A computer modem has the ability to "modulate" an analog signal by converting digital signal data bits represented by 0 and 1 values into variations on the analog sine wave so that data can be transmitted over the PSTN. A receiving modem reverses this process and "demodulates" the analog signal into a digital bit stream.

Conventional digital subscriber lines are used for transmitting high-bandwidth information over UTP telephone lines. Because high-bandwidth transmissions can reach very high transmission rates, DSL lines enable the continuous transmission of large files, such as complex video and audio data files. Analog transmissions only use a small portion of the available amount of bandwidth, or transmission capacity, over copper wires. DSL technology allows transmission of digital data over twisted pairs without converting digital data into and out of analog form. Both digital signals and analog signals can be transmitted simultaneously, allowing the telephone service provider to utilize a much greater transmission capacity. Because a transmission signal can be separated into analog and digital signals, an analog telephone and a computer and/or other digital messaging device can be used on the same line at the same time.

Such digital signals can be transmitted over a "broadband" connection to a customer premises simultaneously with analog voice transmissions in the POTS system. "Broadband" is a transmission facility providing wide bandwidth transmission capacity that allows transmission of large amounts of digital data. Broadband channels comprise twisted pairs or can be fiberoptic in nature. When a broadband channel connection is configured as "always on," data messages can be sent and received quickly and efficiently by messaging devices connected to the broadband channel. A broadband connection allows data messages to be sent and received at any time, even while the analog voice service is in use. In embodiments of the present invention, using a broadband connection allows a message server to send messages directly to a wireline-messaging device, thus avoiding any need for transmitting signals over narrow band channels or forwarding messages through AIN components in a network.

In the embodiments of the present invention shown in FIGS. 1-4, a broadband ADSL 82 is used as the signaling channel for the IP message 81. ADSL is a high-speed transmission technology that sends high-speed digital signals up and down existing telephone company unshielded twisted pair copper wires using ASDL modems at both the end office and the subscriber's premises. ADSL is characterized as "asymmetric" because more information is sent in a downstream direction to an end user than in the upstream direction to the telephone company. The high downstream bandwidth allows the telephone line to bring in large-file, complex data to a user. Because user requests and responses are usually small, requiring little upstream bandwidth, a small portion of bandwidth is available for upstream or user-interaction messages. Typically, ADSL transmissions are carried on existing telephone lines.

In other embodiment of the present invention, alternative forms of DSL may be used. For example, wireless-to-wireline data messaging can be transmitted using high bit-rate DSL (HDSL), very high data rate (VDSL), integrated services digital network DSL (ISDN-DSL), and G.shdsl, which is a single line or single pair HDSL. The systems and methods of the present invention are operable with any broadband connection utilizing an Open Systems Interconnection (OSI) Reference Model Layer 2 data link transport technology. For example, broadband connections can include "Integrated-Fiber-in-the-Loop" (IFITL) technology or can be coaxial cable. Other broadband connections may be used as alternatives.

In the present invention, analog voice calls and data messages can be carried over the same physical wires, for example, lines in a POTS system. In the embodiments in FIGS. 1-4, End Office 91 in PSTN 90 transmits an analog voice signal 92 over POTS line 93 to premises 100. The analog voice signal 92 is transmitted to premises 100 simultaneously with the IP message 71 over the ADSL broadband connection 72.

As shown in FIGS. 1-4, the analog voice signal 92 is directed to the same wireline number as the IP signal 95. In the embodiment in FIG. 1, when the analog voice signal 92 and the IP signal 71 reach the intended premises 100, a low pass (LP) filter (not shown), integrated with a premises telephone 120, allows the analog voice signal 92 to pass through to the premises telephone 120 to complete transmission of a conventional analog call. A low pass filter is a device that allows signals of frequencies below a certain range to pass. A high pass (HP) filter (not shown), integrated with an ADSL gateway 130, allows the IP signal 71 to pass through to digital devices connected to the ADSL gateway 130. A high pass filter is a device that allows signals of frequencies above a certain range to pass. A gateway is defined as an entrance and exit, such as a node, or point connection, into a communications network. A gateway is typically an electronic repeater device that intercepts and steers electrical signals from one network to another.

An ADSL gateway, such as a modem or router, is an intelligent service node, or data switch, that connects a premises terminal communication device over an ASDL line with a data network, such as the Internet. An ADSL gateway is associated with an IP address that is stored in a message application server. As shown in FIG. 1, the ADSL gateway 130 can route the IP message 71 from the message application server 50 to a personal computer (PC) 140 using a point-to-point protocol session (PPP-1) 131 and/or to the wireline-messaging device 150 using a point-to-point protocol session (PPP-2) 132. A point-to-point protocol is a protocol that provides a means for connecting the PSTN from a home personal computer or other digital computing device to an Internet service provider (ISP).

In the embodiment in FIG. 1, the wireline-messaging device 150 is a stand-alone terminal device having Internet capabilities. The wireline-messaging device 150 comprises thin client software 151 that allows the wireline device 150 to receive and send messages independent of the call processing functions for voice services operated by the premises telephone 120. "Thin client" refers to devices containing limited processing power, or RAM, and software that requests information, such as applications and files, from a central server or network, and are dependent upon a server or network to operate.

In embodiments of the present invention, thin client software in wireline-messaging devices comprises a session initiation protocol (SIP) protocol stack. A SIP is an application layer protocol for the establishment, modification, and termination of conferencing and telephony sessions using text-based messages over IP-based networks. SIP addressing can be built around a telephone number or a Web host name SIP negotiates features and capabilities of the session, such as algorithms for converting voice signals from their analog form to digital signals acceptable to the terminals, at the time the session is established. In other embodiments, the thin client software SIP stack comprises an instant messaging (IM), or real-time, on-line electronic mail, application. In other embodiments, the thin client software comprises a wireless application protocol (WAP).

As shown in FIG. 1, the wireline-messaging device 150 is connected to the premises ADSL gateway 130 using a data connection 133. The data connection 133 can be accomplished using a cable, such as an Ethernet connection. In alternative embodiments, the data connection 133 comprises a wireless connection, for example, an 802.11 or Bluetooth standard connection. In other embodiments, a terminal wireline-messaging device can comprise a personal computer (PC), a personal digital assistant (PDA), and/or other data communication device.

Figure 2:
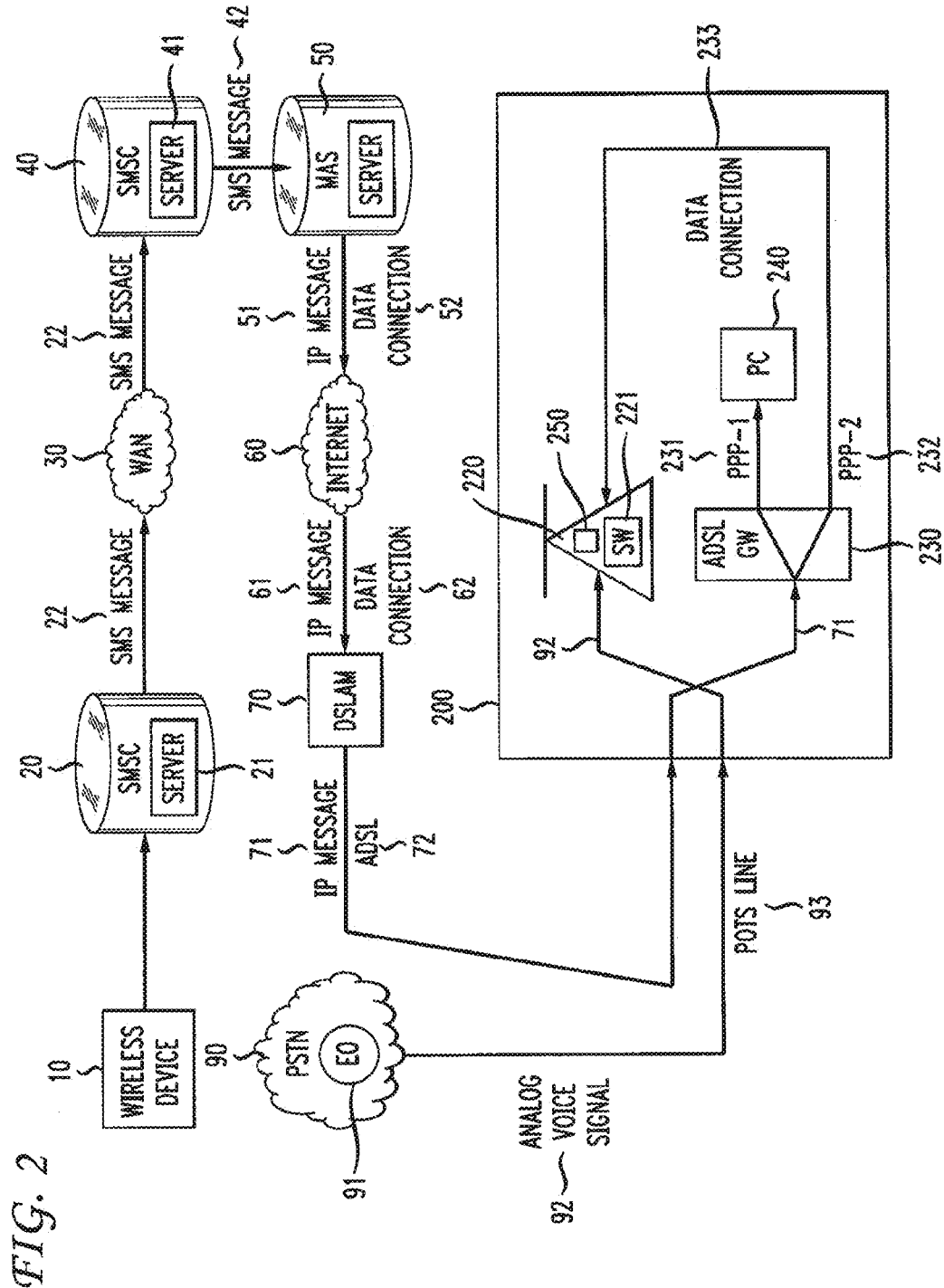
FIG. 2 is a block diagram of wireless to wireline messaging via a broadband ADSL connection with an integrated premises telephone and wireline-messaging device externally connected to a premises ADSL gateway in an embodiment of the present invention.

The embodiment in FIG. 2 is similar to that shown in FIG. 1, with the exception that a wireline-messaging device 250 is integrated with a premises telephone 220. That is, the premises telephone 220 is adapted to send and receive data messages. In the embodiment in FIG. 2, a low pass filter (not shown), integrated with the premises telephone 220, allows the analog voice signal 92 to pass through to the premises telephone 220 to complete transmission of a conventional analog call. A high pass filter (not shown), integrated with an ADSL gateway 230, allow the IP message 71 to pass through to digital devices connected to the ADSL gateway 230.

The integrated wireline-messaging device 250 comprises thin client software 221 that allows the wireline device 250 to receive and send messages independent of the call processing functions for voice services operated by the premises telephone 220. In embodiments, the thin client software 221 comprises a session initiation protocol (SIP) protocol stack. In other embodiments, the thin client software 221 SIP stack comprises an instant messaging (IM) application. In still other embodiments, the thin client software 221 comprises a wireless application protocol (WAP).

As shown in FIG. 2, the integrated wireline-messaging device 250 is connected to the premises ADSL gateway 230 using a data connection 233. The data connection 233 can be accomplished using a cable, such as an Ethernet connection. In alternative embodiments, the data connection 233 comprises a wireless connection, for example, an 802.11 standard connection.

Figure 3:
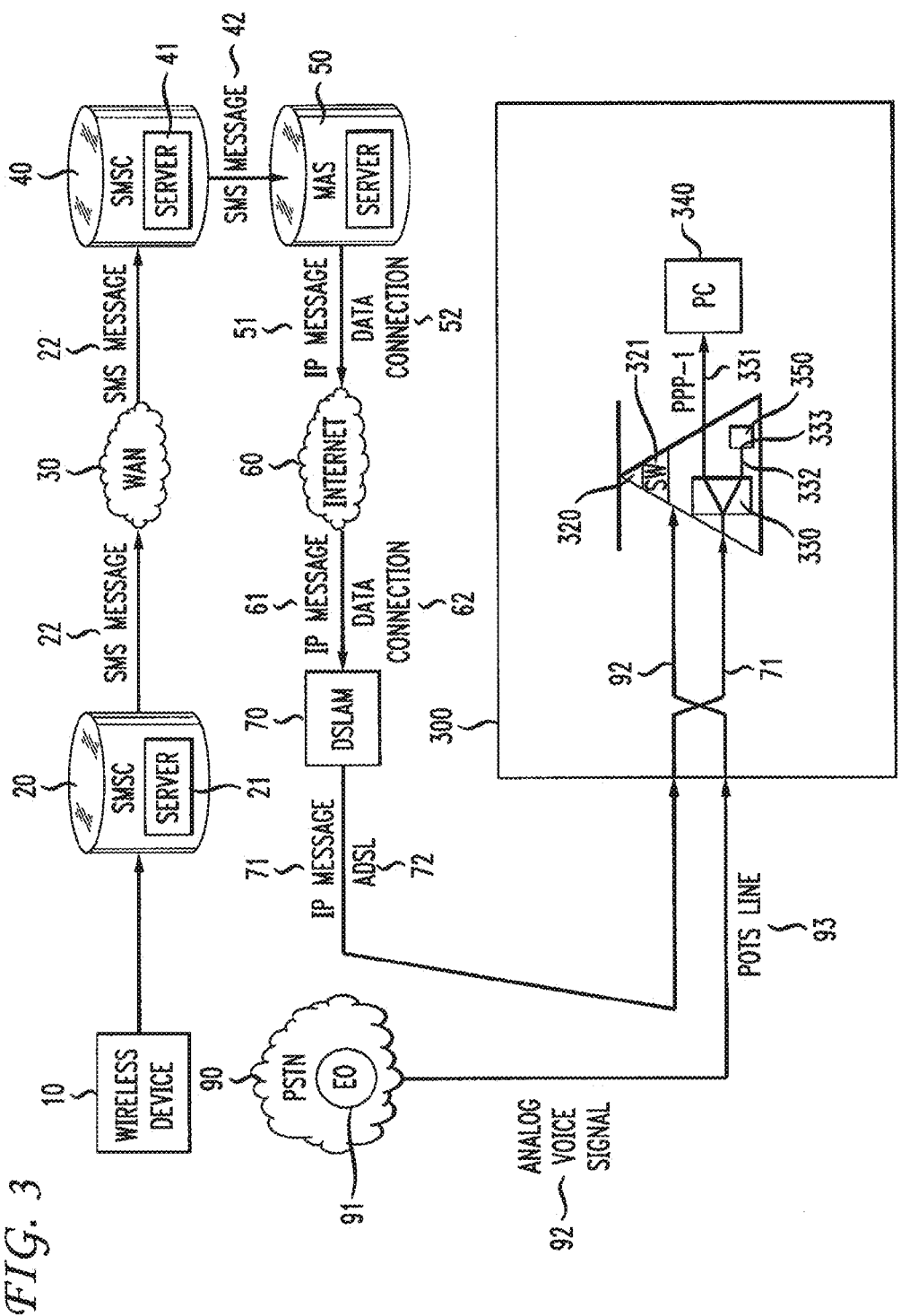
FIG. 3 is a block diagram of wireless to wireline messaging via a broadband ADSL connection with an integrated premises telephone, premises ADSL gateway, and wireline-messaging device in an embodiment of the present invention.

The embodiment in FIG. 3 is similar to that shown in FIG. 2, with the exception that a premises telephone 320, a wireline-messaging device 350, and an ADSL gateway 330 are integrated. In this embodiment, the premises telephone 320 is adapted to send and receive data messages and the ADSL gateway 330 is internal to the premises telephone 320. In the embodiment in FIG. 3, a low pass filter (not shown), integrated with the premises telephone 320, allows the analog voice signal 92 to pass through to the premises telephone 320 to complete transmission of a conventional analog call. A high pass filter (not shown), integrated with an ADSL gateway 330, allows the IP message 71 to pass through to digital devices integrated with or connected to the ADSL gateway 330. As shown in FIG. 3, the integrated wireline-messaging device 350 is internally connected to the premises ADSL gateway 330 using an internal data connection 333.

In embodiments of the present invention, multiple users and/or wireline-messaging devices can receive messages via one broadband, such as ADSL, gateway. Privacy concerns create the need to avoid sending a particular data message to multiple terminal messaging devices or users connected to one broadband gateway. In such embodiments, multiple users and/or terminal messaging devices can receive only the messages intended for the particular user and/or device through the same premises broadband gateway. Each of the multiple user accounts, or mailboxes, and/or terminal messaging devices is associated with a unique static, or fixed, IP address, such as a uniform resource locator (URL) or electronic mail address. The IP addresses are stored in a message application server.

In such embodiments, the broadband gateway has individual ports assigned to each of a plurality of messaging devices. Alternatively, each of a plurality of messaging devices comprises a unique address. As a result, terminal-messaging devices could be placed at multiple locations in a premises, such as a house or office, so that a message could be sent to a particular device or user without being routed to each device or user in the premises. In addition, using a unique IP address for each terminal device in a premises allows the use of only one premises broadband gateway.

Figure 4:
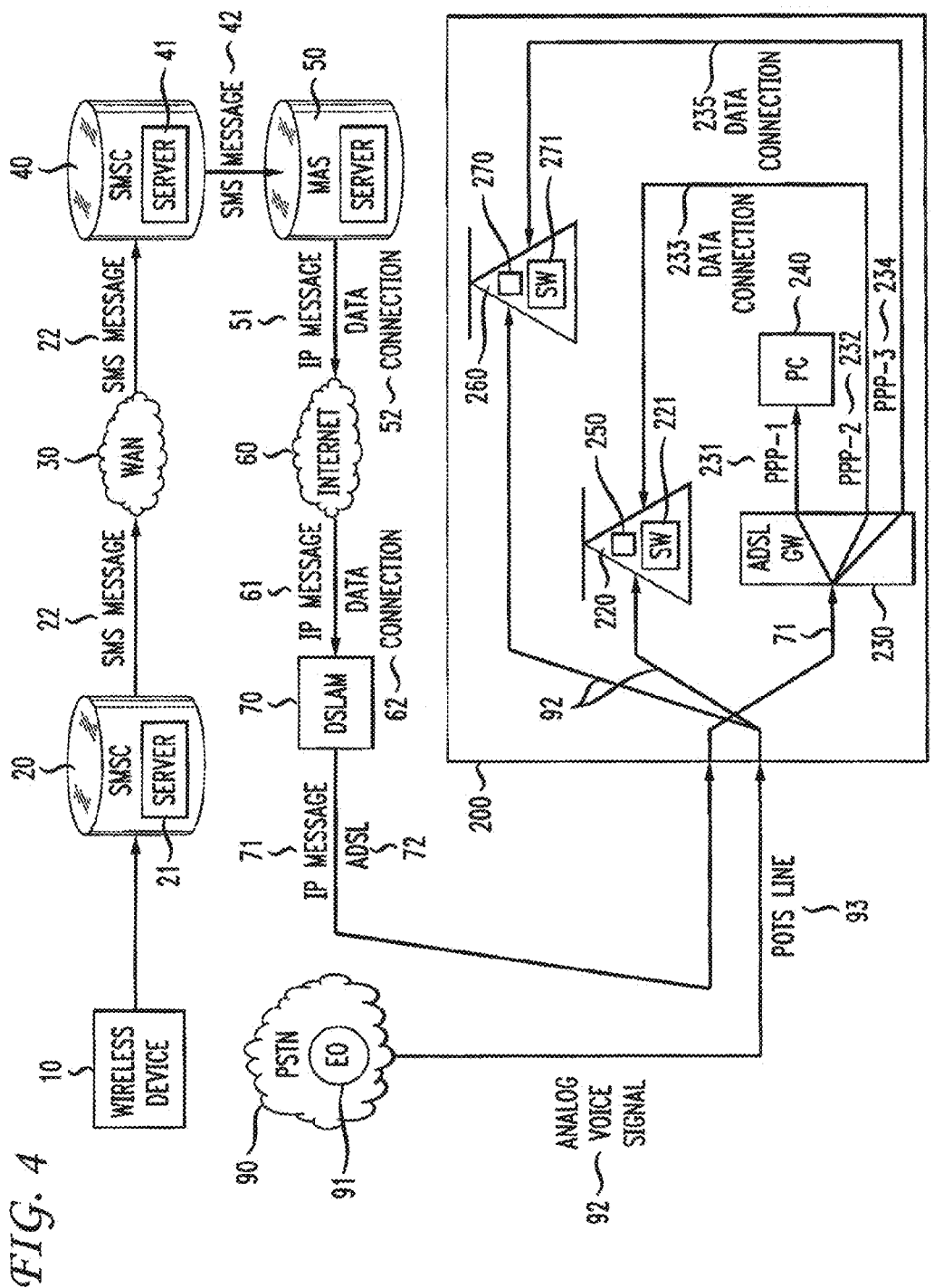
FIG. 4 is a block diagram of wireless to wireline messaging via a broadband ADSL connection with a plurality of integrated premises telephones and wireline-messaging devices externally connected to a premises ADSL gateway in an embodiment of the present invention.

For example, in the embodiment in FIG. 4, both the wireline-messaging device 250 and another wireline-messaging device 270, both connected to the same premise ADSL gateway 230, can receive data messages intended specifically for the particular device. In FIG. 4, the wireline-messaging devices 250 and 270 are integrated with the premises telephone 220 and the premises telephone 260, respectively. A low pass filter (not shown), integrated with the premises telephones 220 and 260, allows the analog voice signal 92 to pass through to the premises telephones 220 and 260, respectively, to complete transmission of a conventional analog call. A high pass filter (not shown), integrated with an ADSL gateway 230, allows the IP message 71 to pass through to digital devices connected to the ADSL gateway 230.

The ADSL gateway 230 can route the IP message 71 from the message application server 50 to a personal computer (PC) 240 using a point-to-point protocol session (PPP-1) 231, to the integrated wireline-messaging device 250 using a point-to-point protocol session (PPP-2) 232, and/or to the integrated wireline-messaging device 270 using a point-to-point protocol session (PPP-3) 234. The device to which the ADSL gateway 230 routes the IP message 213 depends on the unique IP address mapped by the message application server 50 to the premises directory number in response to selection of the intended recipient of the message by the user of wireless device 10.

The integrated wireline-messaging devices 250 and 270 comprise thin client software 221 and 261, respectively, that allows the wireline devices 250 and 270 to receive and send messages independent of the call processing functions for voice services operated by the premises telephones 220 and 260. As shown in FIG. 4, the integrated wireline-messaging devices 250 and 270 are connected to the premises ADSL gateway 230 using data connections 233 and 235, respectively.

In alternative embodiments, rather than each terminal messaging device or user account having a unique IP address, data messages can be password protected. For example, consumer premises equipment (CPE) may include the intelligence to display only the name of the intended recipient of the message, without displaying the message. The user for whom the message is intended would then type in a password to have that entire message displayed.

In another embodiment shown in FIG. 5, a user of a wireless communication device 10 sends a SMS message 22, including a wireline directory number (DN) 23, to a wireless network SMSC 20. The wireless network SMSC 20 forwards the SMS message 22 to a wireline network SMSC 40 using the wireline DN 23 as the routing address. Although the embodiment shown in FIG. 5 includes SMS messages and SMS Centers, other embodiments include messages and centers associated with enhanced message services (EMS), and multi-media message services (MMS), as well as wireless application protocol (WAP) messages. Such services, messages, and service centers operate in similar fashion to that described for SMS messages and SMSCs.

Referring to FIG. 5, the wireline network SMSC 40 forwards the SMS message 22 to a messaging application server 50 in a network infrastructure, including the wireline DN 23 as the terminating address and the wireless device DN 24 as the originating address. When multiple users and/or terminal wireline-messaging devices are associated with the wireline DN 23 and such data is stored in the message application server 50, the message application server 50 sends a return message 53 to the wireline network SMSC 40 requesting identification of the specific intended recipient of the SMS message 22 associated with the wireline DN 23. The wireline network SMSC 40 forwards the return message 53 back to the wireless network SMSC 20 using the wireless DN 24 as the routing address. The wireless SMSC 20 then forwards the return message 53 back to the wireless communication device 10 requesting identification of the specific intended recipient of the SMS message 22 associated with the wireline DN 23.

In response to the return message 53, the user of the wireless device 10 selects the intended recipient of the SMS message 22 and sends a response message 26 through the wireless network SMSC 20 back to the wireline network SMSC 40 using the wireline DN 23 as the routing address. The wireline network SMSC 40 then forwards the response message 26 identifying the intended recipient to the message application server 50, including the wireline DN 23 as the terminating address and the wireless device DN 24 as the originating address.

The message application server 50 translates SMS message 22 into IP message 51 for the intended wireline subscriber/recipient. The IP address and a unique port number associated with the particular wireline user account and/or terminal wireline-messaging device 250 associated with the wireline DN 24 are previously stored in the message application server 50. The message application server 50 maps the wireline DN 24 to the selected subscriber/recipient and unique IP address and port number for the wireline-messaging device 250. A point-to-point protocol (PPP) session is established between the message application server 50 and the wireline-messaging device 250. The message application server 50 forwards the IP message 51 to the wireline-messaging device 250 over an ADSL data connection 82. The ADSL connection 82 is connected to a broadband gateway 60, which provides an interface with the network through a network service provider.

The broadband gateway 60 forwards the IP message 51 and mapped wireline DN/IP address 54 over the ADSL connection 82 to a premises ADSL gateway 230. The premises ADSL gateway 230 delivers the IP message 51 to terminal wireline-messaging device 250 over the PPP session between the message application server 50 and the wireline-messaging device 250 using the unique IP address 55 of the wireline-messaging device 250. Because the unique IP address for wireline-messaging device 270 is not the intended recipient, the IP message 51 is not forwarded to wireline-messaging device 270, even though wireline-messaging device 270 is connected to the ADSL gateway 230. In this manner, data messages are selectively sent to individual user accounts and/or devices connected to the same premises broadband gateway.

Although the present invention has been described with reference to particular embodiments, it should be recognized that these embodiments are merely illustrative of the principles of the present invention. Those of ordinary skill in the art will appreciate that systems and methods for messaging between wireless and wireline devices using a broadband connection of the present invention may be constructed and implemented in other ways and embodiments. Accordingly, the description herein should not be read as limiting the present invention, as other embodiments also fall within the scope of the present invention.

What is claimed is:

1. A method comprising:
    mapping, by a system including a message application server, a wireline directory number to an Internet protocol address associated with customer premises equipment of an intended premises and associated with a plurality of wireline-messaging devices located at the intended premises, wherein each of the plurality of wireline-messaging devices is associated with a respective one of a plurality of users and one of the plurality of wireline-messaging devices comprises a premises telephone connected to a public switched telephone network, and wherein the wireline directory number is identified as a routing address for a data message;
    facilitating establishing, by the system, a communication session over a broadband connection between the message application server and each of the plurality of wireline-messaging devices via the customer premises equipment at the intended premises; and
    routing, by the system, a password protected message comprising the data message from the message application server to the customer premises equipment for routing to the plurality of wireline-messaging devices, wherein the routing of the password protected message enables content of the password protected message to be displayed at the premises telephone at the intended premises in response to entry of a password of the password protected message into the premises telephone.

2. The method of claim 1, wherein the customer premises equipment comprises a premises broadband gateway.

3. The method of claim 1, wherein the communication session comprises a point-to-point protocol session.

4. The method of claim 1, wherein the data message is received by the system from a wireless communication device.

5. The method of claim 1, wherein the system includes a wireless network message service center that stores the data message.

6. The method of claim 1, wherein the data message is a short message service message.

7. The method of claim 1, further comprising authenticating, by the message application server, the data message.

8. A system, comprising:
    a processor; and a memory device storing instructions which, responsive to being executed by the processor cause the processor to perform operations comprising:

mapping a wireline directory number to an Internet protocol address associated with customer premises equipment of an intended premises and associated with a plurality of wireline-messaging devices located at the intended premises, wherein each of the plurality of wireline-messaging devices is associated with a respective one of a plurality of users and one of the plurality of wireline-messaging devices comprises a premises telephone connected to a public switched telephone network, and wherein the wireline directory number is identified as a routing address for a data message;

facilitating establishing a communication session over a broadband connection between the system and each of the plurality of wireline-messaging devices via the customer premises equipment at the intended premises; and routing a password protected message comprising the data message from the system to the customer premises equipment for routing to the plurality of wireline-messaging devices, wherein the routing of the password protected message enables content of the password protected message to be displayed at the premises telephone at the intended premises in response to entry of a password of the password protected message into the premises telephone.

9. The system of claim 8, wherein the customer premises equipment comprises a premises broadband gateway.

10. The system of claim 8, wherein the communication session comprises a point-to-point protocol session.

11. The system of claim 8, wherein the data message is received by the system from a wireless communication device.

12. The system of claim 8, wherein the system includes a wireless network message service center that stores the data message.

13. The system of claim 8, wherein the data message is a short message service message.

14. A machine-readable storage medium, comprising executable instructions that, when executed by a processor of a system, facilitate performance of operations, comprising:

mapping a wireline directory number to an Internet protocol address associated with customer premises equipment of an intended premises and associated with a plurality of wireline-messaging devices located at the intended premises, wherein each of the plurality of wireline-messaging devices is associated with a respective one of a plurality of users and one of the plurality of wireline-messaging devices comprises a premises telephone connected to a public switched telephone network, and wherein the wireline directory number is identified as a routing address for a data message;

facilitating establishing a communication session over a broadband connection between the system and each of the plurality of wireline-messaging devices via the customer premises equipment at the intended premises; and routing a password protected message comprising the data message from the system to the customer premises equipment for routing to the plurality of wireline-messaging devices, wherein the routing of the password protected message enables content of the password protected message to be displayed at the premises telephone at the intended premises in response to entry of a password of the password protected message into the premises telephone.

15. The machine-readable storage medium of claim 14, wherein the data message is received by the system from a wireless communication device.

* * * * *